United States Patent [19]

Kato

[11] Patent Number: 4,571,031

[45] Date of Patent: Feb. 18, 1986

[54] WIDE ANGLE ZOOM OBJECTIVE

[75] Inventor: Masatake Kato, Tokyo, Japan

[73] Assignee: Canon Kabushiki Kaisha, Tokyo, Japan

[21] Appl. No.: 459,701

[22] Filed: Jan. 20, 1983

[30] Foreign Application Priority Data

Feb. 1, 1982 [JP] Japan .................................. 57-14540

[51] Int. Cl.⁴ .......................... G02B 9/64; G02B 15/14
[52] U.S. Cl. ..................................... 350/426; 350/423; 350/432
[58] Field of Search ................ 350/426, 427, 432, 423

[56] References Cited

U.S. PATENT DOCUMENTS

| | | | |
|---|---|---|---|
| 2,704,487 | 3/1955 | Rosier | 350/423 |
| 2,906,171 | 9/1959 | Bergstein | 350/423 |
| 4,111,558 | 9/1978 | Ikemori | 350/432 |
| 4,159,865 | 7/1979 | Kawamura et al. | 350/423 |
| 4,168,110 | 9/1979 | Itoh | 350/426 |

*Primary Examiner*—John K. Corbin
*Assistant Examiner*—Rebecca D. Gass
*Attorney, Agent, or Firm*—Toren, McGeady, Stanger, Goldberg & Kiel

[57] ABSTRACT

A wide angle zoom objective has three lens units of which the first counting from front is of negative power, the second is of positive power and the third is of negative power. At least one lens surface in the first unit has an aspheric surface, and the units are arranged to move differentially during zooming.

8 Claims, 50 Drawing Figures

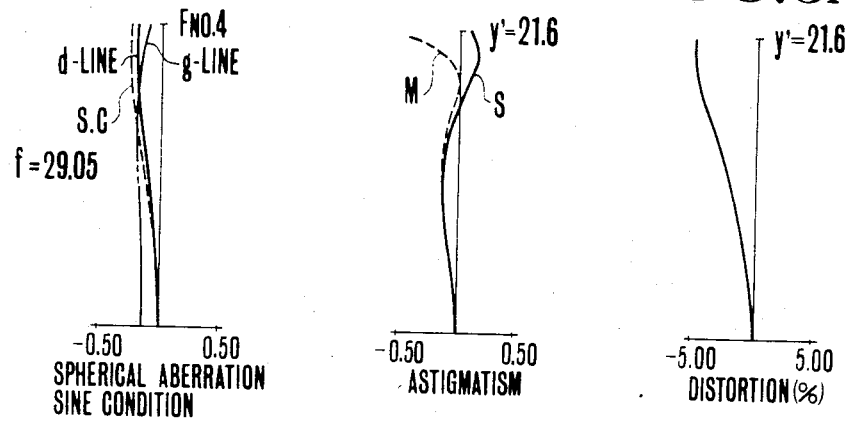
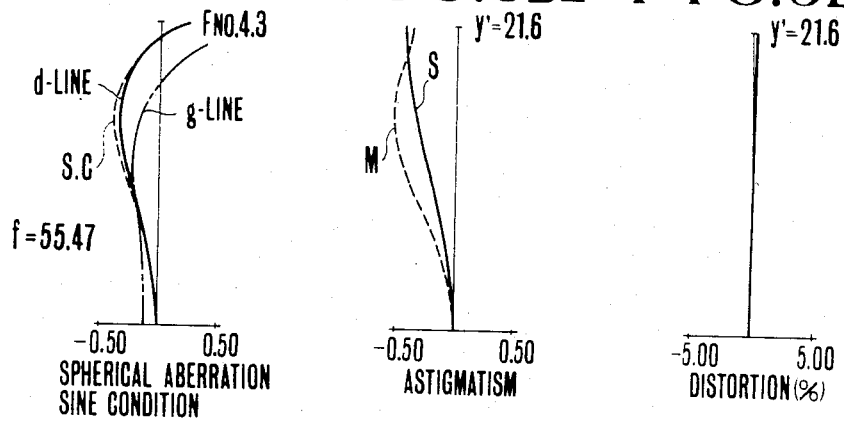
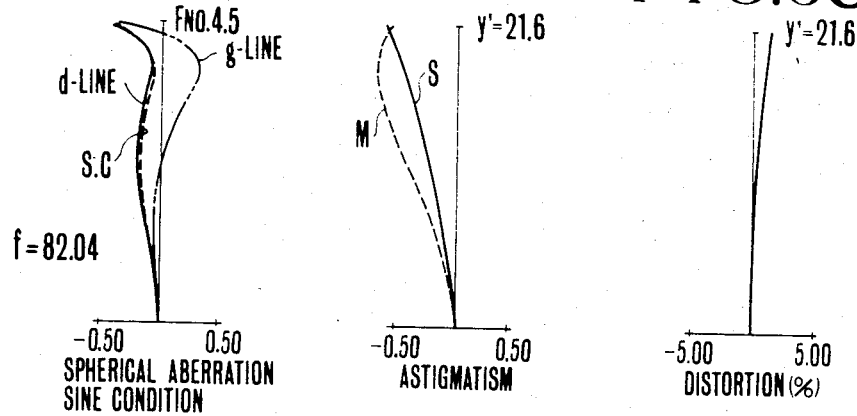

FIG.7A1 FIG.7A2 FIG.7A3
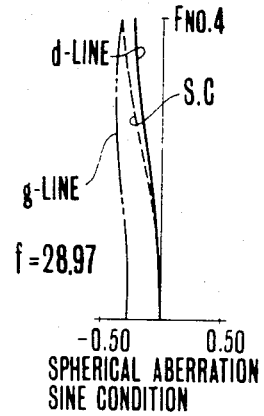 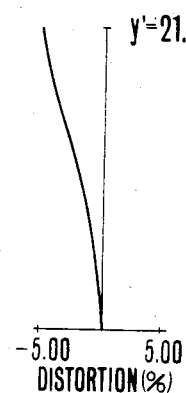
FIG.7B1 FIG.7B2 FIG.7B3
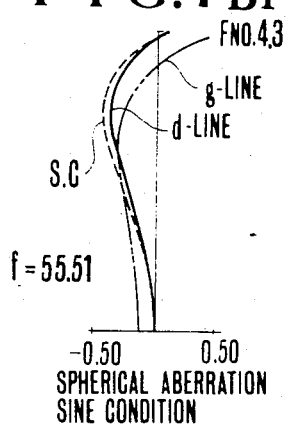 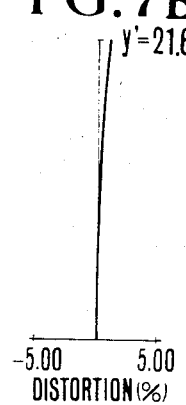
FIG.7C1 FIG.7C2 FIG.7C3
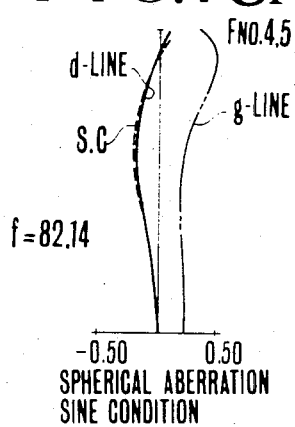 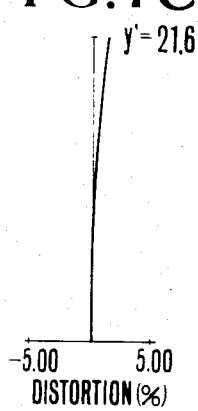

FIG.8A1
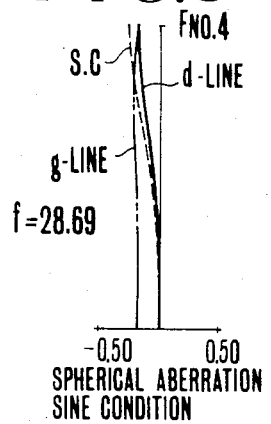
SPHERICAL ABERRATION
SINE CONDITION
FIG.8A2
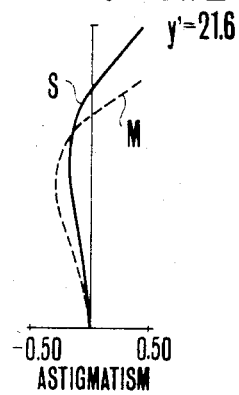
ASTIGMATISM
FIG.8A3
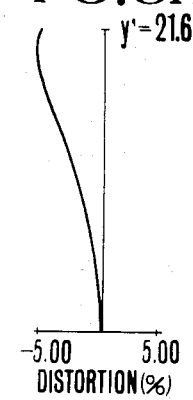
DISTORTION(%)
FIG.8B1
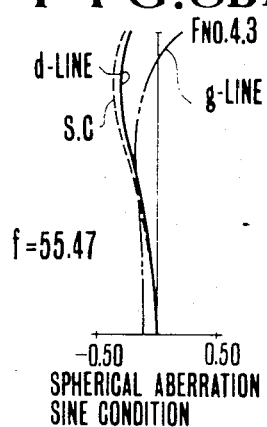
SPHERICAL ABERRATION
SINE CONDITION
FIG.8B2
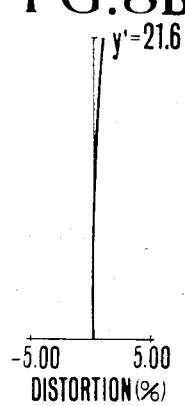
ASTIGMATISM
FIG.8B3
DISTORTION(%)
FIG.8C1
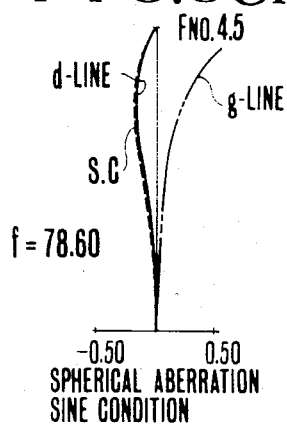
SPHERICAL ABERRATION
SINE CONDITION
FIG.8C2
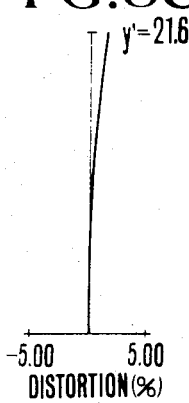
ASTIGMATISM
FIG.8C3
DISTORTION(%)

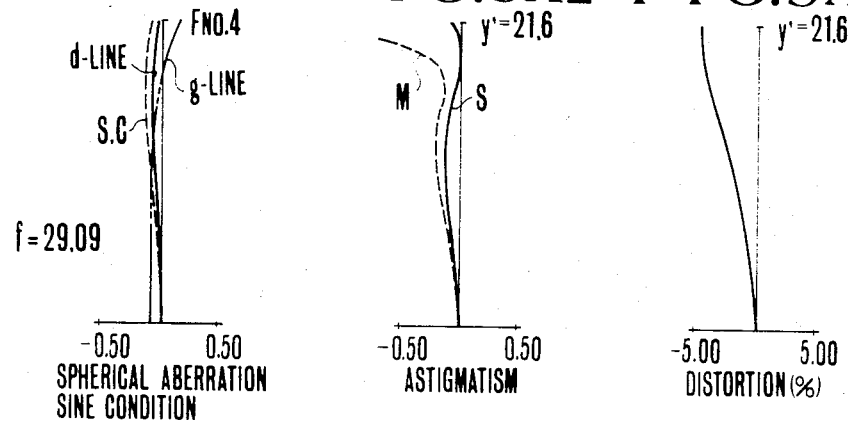
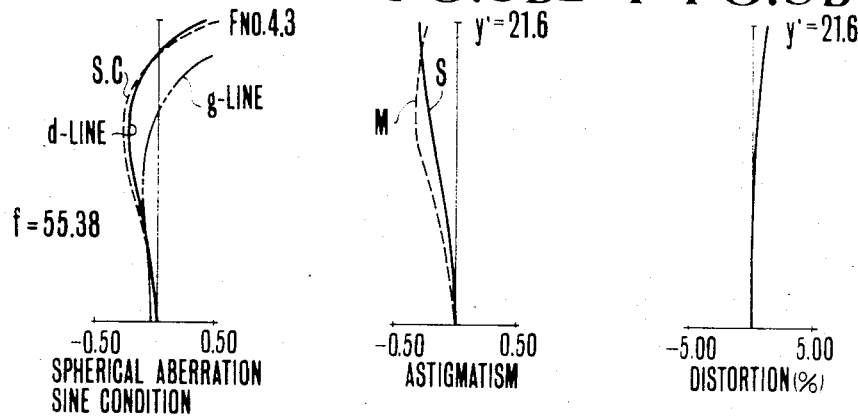
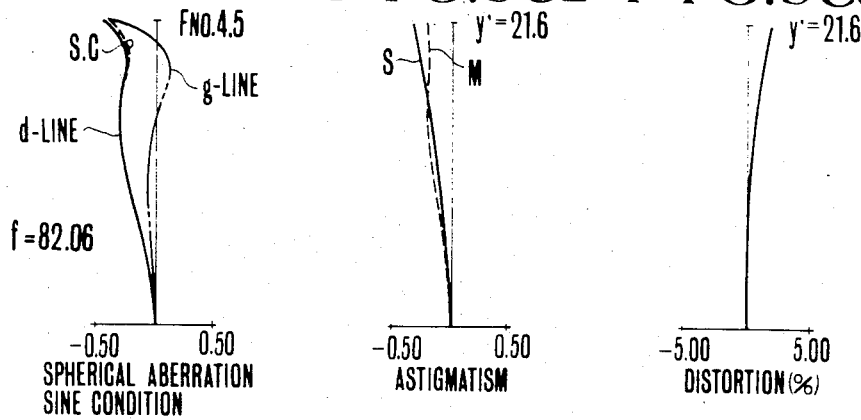

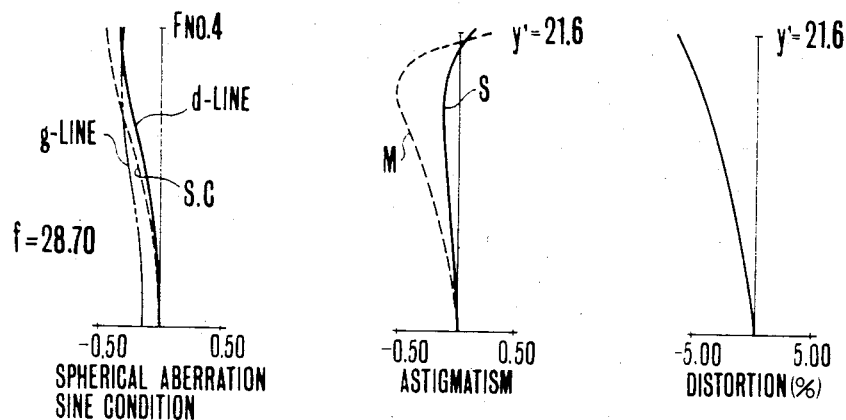
FIG.10A1 FIG.10A2 FIG.10A3
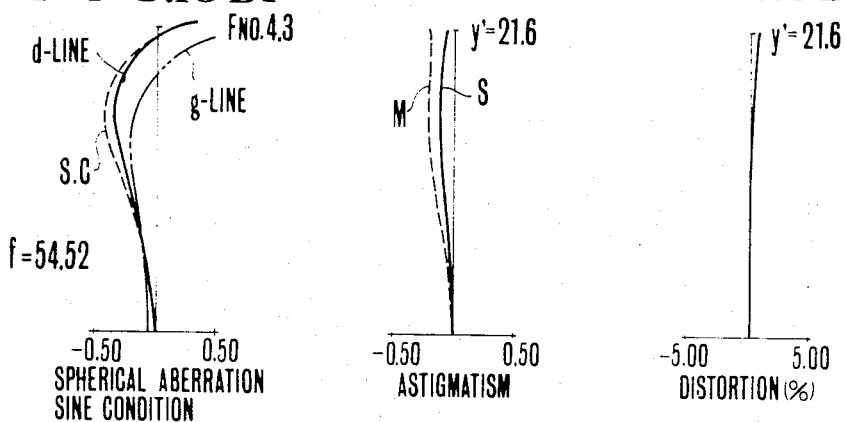
FIG.10B1 FIG.10B2 FIG.10B3
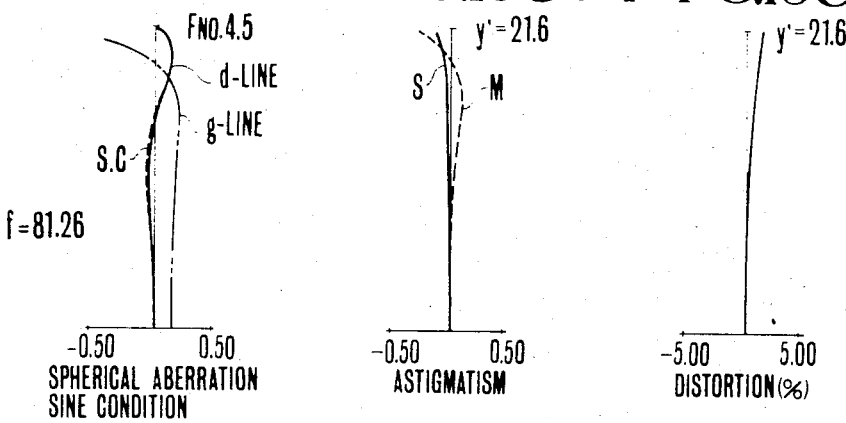
FIG.10C1 FIG.10C2 FIG.10C3

WIDE ANGLE ZOOM OBJECTIVE

BACKGROUND OF THE INVENTION

1. Field of the Invention

This invention relates to wide angle zoom objectives, and more particularly to wide angle zoom objectives with three lens components movable for zooming.

2. Description of the Prior Art

Zoom objectives having two lens components, groups, or units movable for zooming, i.e. of the so-called two unit type, have been known in many forms. Most of these zoom objectives provide magnification ranges of less than 2 and are simple in construction. However, to obtain a significant increase in the zoom ratio requires an increase in the total movement of the varifocal lens system. This results in the problem of objectionably increasing the bulk and size of zoom objective. When the angular field in the wide angle zooming position exceeds 75°, i.e. in a so-called wide angle zoom objective, the amount of distortional aberration generally encountered in the wide angle positions is increased in the negative sense, and this is very difficult to correct. In a two-unit zoom objective that merely has a spherical lens system, therefore, the use of the diverging elements in the first lens unit in correcting the distortion calls for an increase in the number of lens elements constituting the first unit. The diameter of the front lens elements also tends to increase. Therefore, the spherical form is not suitable for a wide angle zoom objective having an extended range.

A method of increasing the zoom ratio by moving three lens components has been proposed in Japanese Laid-Open Pat. No. Sho 57-26816.

A zoom objective using an aspheric surface for the purpose of achieving good correction of aberrations has been proposed in Japanese Laid-Open Pat. No. Sho 57-20713 and U.S. Pat. No. 3,191,496.

Also, the use of a mold type aspherical lens of plastics material is proposed in U.S. Pat. No. 3,972,592.

SUMMARY OF THE INVENTION

It is an object of the present invention to provide a wide angle zoom objective with three lens units made axially movable to effect zooming over a greatly extended range while preserving high grade imaging performance and still maintaining a minimization of the bulk and size of the entire system.

To achieve this, according to a feature of the invention, the lens system is constructed so that a first lens unit having a negative focal length, a second lens unit having a positive focal length and a third lens unit having a negative focal length are arranged from front to rear and the air separations between the successive two lens unit are both varied to change the focal length of the entire system in a range of about 3 times, and the second lens unit is arranged to move in one direction during zooming from one end of the range to the other, and that at least one surface in the first lens unit is formed to an aspheric shape, to thereby achieve good stability of all aberrations throughout the extended range and minimization of the bulk and size of the entire lens system.

BRIEF DESCRIPTION OF THE DRAWINGS

FIGS. 6-A-1 through 6-A-3, FIGS. 6-B-1 through 6-B-3 and FIGS. 6-C-1 through 6-C-3 are graphic representations of the aberrations of the objective of FIG. 1.

FIGS. 7-A-1 through 7-A-2, FIGS. 7-B-1 through 7-B-3 and FIGS. 7-C-1 through 7-C-3 are graphic representations of the aberrations of the objective of FIG. 2.

FIG. 8-A-1 through 8-A-3, FIGS. 8-B-1 through 8-B-3 and FIGS. 8-C-1 through 8-C-3 are graphic representations of the aberrations of the objective of FIG. 3.

FIGS. 9-A-1 through 9-A-3, FIGS. 9-B-1 through 9-B-3 and FIGS. 9-C-1 through 9-C-3 are graphic representations of the aberrations of the objective of FIG. 4.

FIGS. 10-A-1 through 10-A-3, FIGS. 10-B-1 through 10-B-3 and FIGS. 10-C-1 through 10-C-3 are graphic representations of the aberrations of the objective of FIG. 5.

DETAILED DESCRIPTION OF THE PREFERRED EMBODIMENTS

Figure 1:
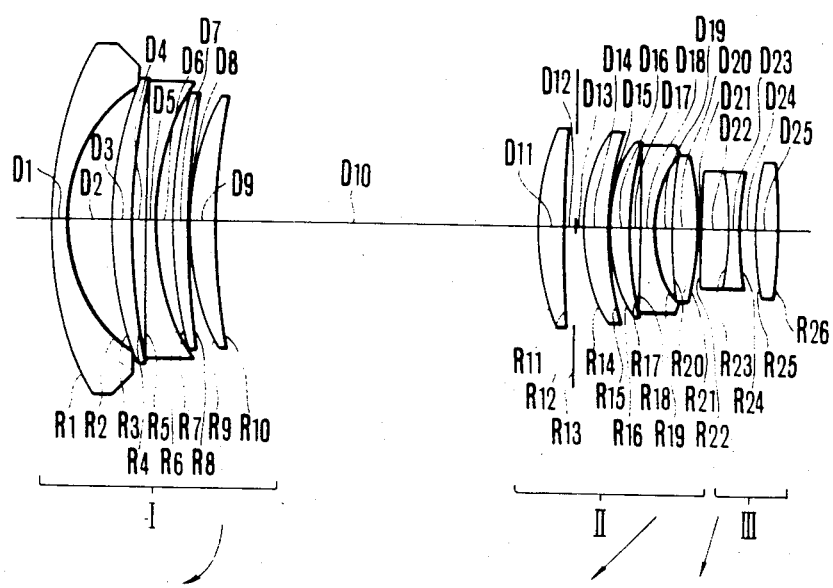
FIGS. 1 through 5 are lens block diagrams of five different embodiments of wide angle zoom objective according to the present invention.
Figure 2:
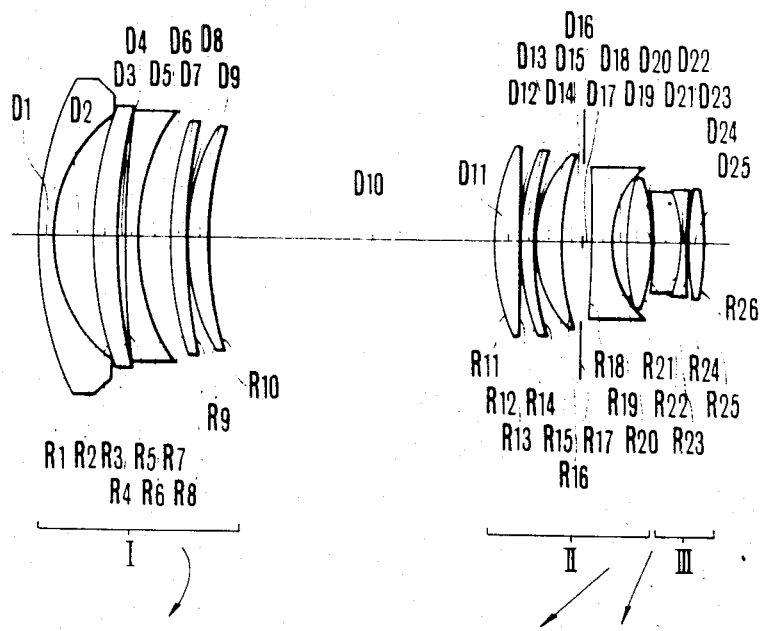
Figure 3:
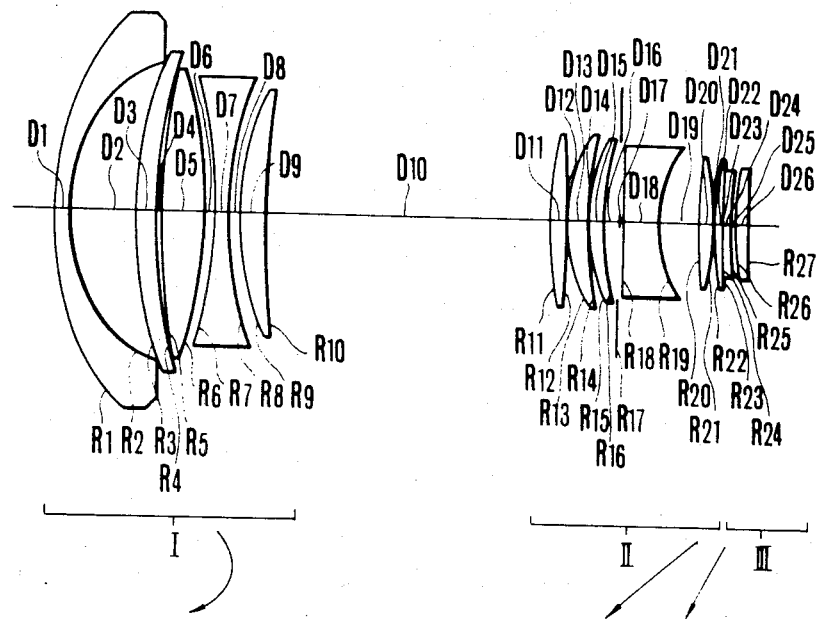
Figure 4:
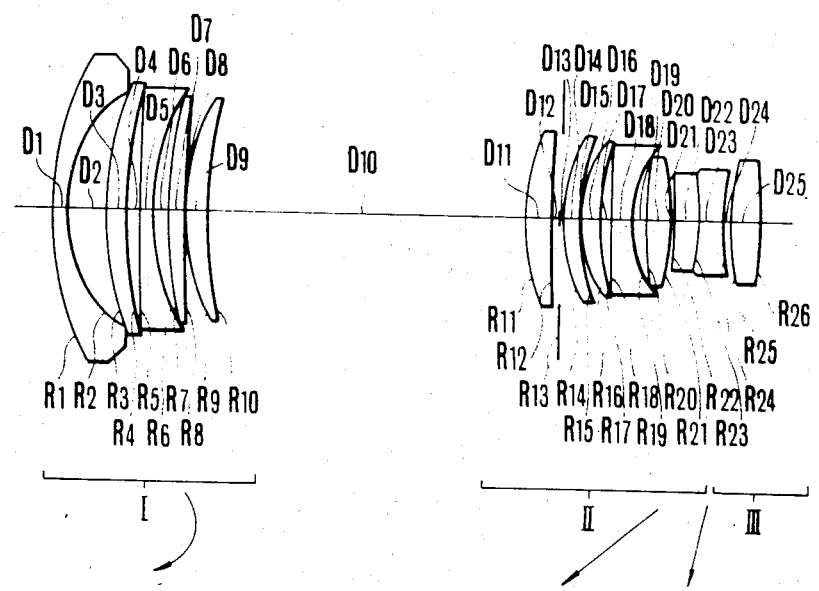
Figure 5:
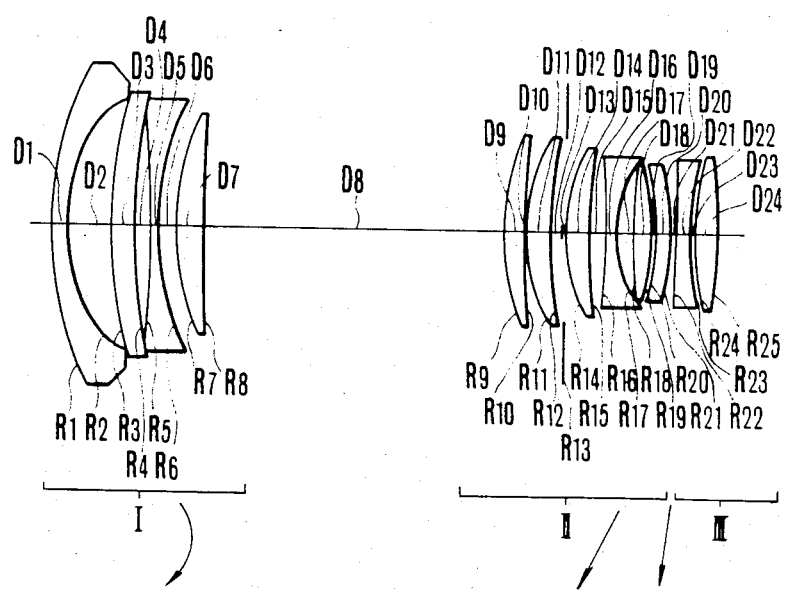

In FIG. 1, the wide angle zoom objective of the present invention comprises, from front to rear, a first lens unit I having a negative focal length, a second lens group II having a positive focal length with a stop therein and a third lens unit III having a negative focal length, all these lens units being moved in differential relation to each other to change the focal length of the entire system, while maintaining the constant image plane. In more detail, during zooming from the wide angle to the telephoto position, the aforesaid second and third lens units move forward linearly while the axial air separation therebetween is expanded, and the first lens unit moves reciprocatingly in a path convex toward the rear to compensate for the shift of the image plane resulting from the movement of the second and third lens units.

To achieve an increase in the zoom ratio in conventional zoom objects of the two-component type, the positive power of the second component had to be strengthened, or its total movement had to be increased. The strengthening of the refractive power of the second unit is not desirable from the point of view of correcting all aberrations. The increase of the total movement of the second unit not only leads to increasing the bulk and size of the lens system, but also has the additional important drawback that movement of the second component while carrying a diaphragm increases the diameter of diaphragm aperture in the telephoto positions. In the present invention, to eliminate these drawbacks, the lens configuration is changed by moving a third unit having a negative focal length and in rear of the second unit forward when zooming from the wide angle to the telephoto position, while expanding the separation between the second and third lens unit. This makes it possible to minimize the required total movement of the second lens unit and also the diameter of the diaphragm aperture. The first lens unit is moved back and forth during zooming to effect image shift compensation.

In such a zoom type, the first lens component is provided with a meniscus-shaped first lens 1A of negative power convex toward the front at the frontmost position and another meniscus-shaped second lens 1B of positive power convex toward the front at the rearmost postion. The first lens unit also includes an aspheric lens made of a plastic material, having a small refractive power in the central portion thereof, and positioned between the lenses 1A and 1B.

The significance of the above-described form and construction and arrangement of the lenses is as follows. The first unit of negative power in the two-unit zoom objective, has two versions the first lens element counting from the front may be a positive lens and a negative one. The former is advantageous at correcting distortion in the wide angle positions, but disadvantageous in correcting spherical aberration in the telephoto positions. This occurs because, in wide angle positions, when a skew light pencil of large angle is incident upon, and then refracted by, the positive lens, for this section produces distortion tendency toward distortion of the pincushion type, and because the first lens unit the other lens elements have distortion of the barrel type which will be advantageously corrected for distortion. However, the diameter of the front lens members is increased, thus sacrificing the compactness required for the zoom objective. To reduce the diameter of the front members, the positive lens must be followed by a negative lens of strong refractive power. However since the curvature of the rear surface of that negative lens is necessarily intensified, when zooming to the telephoto positions, where the on-axis light beam takes increasing diameters, this lens surface produces increasing spherical aberration of the over-corrected form which becomes very difficult to compensate for. On the other hand, as in the present invention, the use of the negative lens as the first lens, because its refractive power becoming not too strong, provides reduction of the spherical aberration, and facilitates correction of aberrations in the telephoto positions although the zooming range is greatly extended, while nevertheless permitting the diameter of the front members to become very small. However, since the first lens unit has the negative focal length, even weakening of the refractive power of the negative lens allows for residual over-corrected spherical aberration. To correct this, a means is provided in the form of the meniscus-shaped lens 1B of positive power convex toward the front as the rearmost or last lens element of the first lens unit with an advantage that the spherical aberration can be well corrected particularly in the telephoto positions. Such construction and arrangement of the first lens element counting from the front in the first lens unit in the form of the negative lens and the last lens element in the form of the positive lens gives advantages of minimizing the diameter of the front lens members and correcting spherical aberration in the telephoto positions. However, this cannot be said to suffice for correction of distortion in the wide angle positions. It has already been known in the art of two-component zoom objectives to stabilize the distortion throughout the zooming range by applying an aspherical surface to the first or negative lens element of the 1st unit. Such a conventional method could not be said to be a very suitable since the production cost is very high due to the large diameter of the aspherical lens element and the elaborate polishing-to-aspheric surface technique.

In the present invention, use is made of an aspherical third lens 1C of plastic material having a small refractive power in a central portion thereof arranged between the first and second lenses 1A and 1B in the 1st lens unit. This results in a wide angle zoom objective which is inexpensive but well corrected for distortion in the wide angle positions. At the present time, not very many plastic materials are usable as the optical glass. Of these, there are well known polymethylmetacrylate and polystyrene are relatively homogeneous and colored to negligible degree. Using one of these synthetic resin materials in manufacturing aspherical lenses of the molded type permits obtaining photographic objectives of reduced price. However, the plastic material is so susceptible to the ambient temperature change that the refractive index changes more than 10 times that of the optical glass. This gives rise to a problem, namely that an appreciable image point shift occurs when a temperature change is unduly large. According to the present invention, therefore, considering the difficulty of producing an aspherical surface, in order to solve these problems, the wide angle objective is constructed by using an aspherical lens of plastic material whose refractive power of the central portion which contributes to determine the focal length is made as small as possible and that as the radial distance departs therefrom toward the edge of the lens, the curvature is made progressively stronger.

Preferably the above-described plastic aspherical lens contributes a focal length $f_{MO}$ to the shortest focal length fw of the entire system a while the focal length $f_{MO}$ lying within the following range:

$$|f_{MO}| > 10fw$$

In view of the main aim of correcting distortion in the wide angle position, the position the aspherical surface has to take in such a configuration is that of making the height of incidence of the skew pencil of light as high as possible. This will result in significant advantages. As described later, the effect of the aspherical surface an distortion and astigmatism is mutually contradictory to that on aberration correction. In the present invention, however, thanks to the use of a lens unit having a negative focal length as the third lens unit in rear of the stop, the aspherical surface has a multiplicative effect on correction of the distortion and astigmatism. Unlike the aspherical surface in the two-component zoom objective, therefore, the use of the aspherical surface in the three-unit zoom objective with the third component of negative power according to the present invention affords the possibility of reducing the contradictory effect of the distortion and astigmatism so that the advantage achieved by aspherical surface becomes great. For example when the technical idea of the present invention is introduced into the three-component zoom objective of British Pat. No. 398,307, a greater advantage will be obtained.

In order to attain the utmost result from the aspherical surface, one preferably calculates the aspherical surface as follows:

We take an x-axis along the optical axis, a y-axis in a direction perpendicular to the optical axis and the direction in which light advances as positive of the origin at the intersection of the lens surface and the optical axis, and let R denote the radius of curvature of the paraxial region of the lens surface, H the height measured from the optical axis, A, B, C, D and E the aspherical coefficients. An equation for the difference $\Delta X$ between the spherical surface extensively conformed to the paraxial region of the lens surface and the lens surface in the axial directions may be expressed as:

$$\Delta X =$$

$$\frac{\left(\frac{1}{R}\right)H^2}{1+\sqrt{1-\left(\frac{H}{R}\right)^2}} + AH^2 + BH^4 + CH^6 + DH^8 + EH^{10}$$

In this equation, another feature of the invention is to satisfy the following conditions or inequalities:

$$1.0 \times 10^{-6} < B < 5.0 \times 10^{-6} \quad (i)$$

$$-2.0 \times 10^{-9} < C < 6.0 \times 10^{-9} \quad (ii)$$

It should be explained about the above-stated inequalities that when the upper limit of inequality (i) is exceeded, through correction of distortion for wide angle positions becomes easy, it is in the wide angle positions that under-correction of meridional curvature of field results and inward coma is produced, and also in the telephoto positions that under-correction of spherical aberration results. This is difficult to compensate for. When the lower limit of inequality (i) is exceeded, on the other hand, correction of distortion for wide angle positions becomes difficult. To compensate for this residual distortion, the curvature of the first or negative meniscus lens in the first lens unit must be strengthened. If so, because spherical aberration tends to be over-corrected in telephoto positions, this correction becomes difficult.

When the upper limit of inequality (ii) is exceeded, though distortion for wide angle positions is advantageously corrected because of distortions of higher order becoming a larger barrel type distortion, it becomes difficult to correct astigmatisms of higher order in the wide angle positions. When the lower limit of inequalities (ii) is exceeded, on the other hand, though the astigmatism of higher order for wide angle positions is advantageously corrected, it becomes objectionably difficult to correct barrel type distortions of higher order for wide angle positions.

It is to be noted that instead of using the plastic material in making up the aspherical lens of the invention, it is also possible to use a glass material and form the aspherical lens by pressing means.

Focusing of the wide angle zoom objective of the invention is in principle performed by axially moving the first lens unit alone. But it may be otherwise performed either by axially moving the entire system, or by imparting independent axial movement into a portion of the rear lens units.

Five examples of specific objectives of the invention can be constructed in accordance with the numerical data given in the following tables for the radii of curvature, R, the axial thicknesses and air separations, D, and the refractive indices, N, and Abbe numbers, $\nu$, of the glasses of the various lens elements with the subscripts numbered consecutively from front to rear.

Example 1
F = 29.1–82.0   FNO = 1:4–4.5   $2\omega$ = 73.3° – 29.6°

| | | | |
|---|---|---|---|
| R1 = 55.544 | D1 = 2.00 | N1 = 1.77250 | $\nu$1 = 49.6 |
| R2 = 22.673 | D2 = 6.07 | | |
| R3 = 61.638* | D3 = 3.00 | N2 = 1.49171 | $\nu$2 = 57.4 |
| R4 = 81.598 | D4 = 1.39 | | |
| R5 = 238.386 | D5 = 1.70 | N3 = 1.83481 | $\nu$3 = 42.7 |
| R6 = 33.614 | D6 = 2.70 | | |

Example 1
F = 29.1–82.0   FNO = 1:4–4.5   $2\omega$ = 73.3° – 29.6°

| | | | |
|---|---|---|---|
| R7 = 72.177 | D7 = 2.02 | N4 = 1.69895 | $\nu$4 = 30.1 |
| R8 = 110.090 | D8 = 0.13 | | |
| R9 = 34.565 | D9 = 3.68 | N5 = 1.80518 | $\nu$5 = 25.4 |
| R10 = 81.966 | D10 = Variable | | |
| R11 = 37.291 | D11 = 3.64 | N6 = 1.80400 | $\nu$6 = 46.6 |
| R12 = 243.584 | D12 = 1.55 | | |
| R13 = 0.0 | D13 = 1.19 | | |
| R14 = 24.572 | D14 = 3.55 | N7 = 1.69680 | $\nu$7 = 55.5 |
| R15 = 44.859 | D15 = 0.13 | | |
| R16 = 23.020 | D16 = 2.78 | N8 = 1.62299 | $\nu$8 = 58.2 |
| R17 = 45.650 | D17 = 1.26 | | |
| R18 = 204.988 | D18 = 2.22 | N9 = 1.84666 | $\nu$9 = 23.9 |
| R19 = 16.611 | D19 = 2.64 | | |
| R20 = 67.946 | D20 = 3.48 | N10 = 1.72000 | $\nu$10 = 43.7 |
| R21 = −50.125 | D21 = Variable | | |
| R22 = 209.186 | D22 = 4.32 | N11 = 1.59270 | $\nu$11 = 35.3 |
| R23 = −37.197 | D23 = 1.44 | N12 = 1.83481 | $\nu$12 = 42.7 |
| R24 = 41.360 | D24 = 2.30 | | |
| R25 = 51.935 | D25 = 3.18 | N13 = 1.59270 | $\nu$13 = 35.3 |
| R26 = −118.841 | | | |

| f | 29.052 | 55.469 | 82.042 |
|---|---|---|---|
| D10 | 45.618 | 12.506 | 0.633 |
| D21 | 0.454 | 5.820 | 10.975 |

*Aspherical Coefficient
A = 0.0
B = 4.454 × 10$^{-6}$
C = −3.294 × 10$^{-9}$
D = 2.869 × 10$^{-11}$
E = −2.486 × 10$^{-15}$ Example 2
F = 28.9–82.1   FNo. = 1:4–4.5   $2\omega$ = 73.6° – 29.5°

| | | | |
|---|---|---|---|
| R1 = 51.037 | D1 = 2.20 | N1 = 1.80400 | $\nu$1 = 46.6 |
| R2 = 23.922 | D2 = 6.29 | | |
| R3 = 80.529* | D3 = 3.00 | N2 = 1.49171 | $\nu$2 = 57.4 |
| R4 = 80.529 | D4 = 0.96 | | |
| R5 = 163.489 | D5 = 1.70 | N3 = 1.80400 | $\nu$3 = 46.6 |
| R6 = 33.280 | D6 = 4.71 | | |
| R7 = 58.956 | D7 = 2.39 | N4 = 1.69895 | $\nu$4 = 30.1 |
| R8 = 105.309 | D8 = 0.15 | | |
| R9 = 33.532 | D9 = 2.86 | N5 = 1.76182 | $\nu$5 = 26.6 |
| R10 = 51.323 | D10 = Variable | | |
| R11 = 35.727 | D11 = 3.88 | N6 = 1.69680 | $\nu$6 = 55.5 |
| R12 = 556.159 | D12 = 0.13 | | |
| R13 = 40.076 | D13 = 2.06 | N7 = 1.69100 | $\nu$7 = 54.8 |
| R14 = 58.376 | D14 = 0.13 | | |
| R15 = 21.262 | D15 = 3.86 | N8 = 1.69100 | $\nu$8 = 54.8 |
| R16 = 57.894 | D16 = 2.87 | | |
| R17 = 0.0 | D17 = 1.00 | | |
| R18 = 426.769 | D18 = 3.05 | N9 = 1.84666 | $\nu$9 = 23.9 |
| R19 = 15.272 | D19 = 2.16 | | |
| R20 = 38.365 | D20 = 3.62 | N10 = 1.59270 | $\nu$10 = 35.3 |
| R21 = −43.220 | D21 = Variable | | |
| R22 = −119.827 | D22 = 3.89 | N11 = 1.69895 | $\nu$11 = 30.1 |
| R23 = −35.698 | D23 = 0.83 | N12 = 1.80400 | $\nu$12 = 46.6 |
| R24 = 70.246 | D24 = 0.41 | | |
| R25 = 60.762 | D25 = 2.10 | N13 = 1.50137 | $\nu$13 = 56.4 |
| R26 = −81.185 | | | |

| f | 28.970 | 55.508 | 82.138 |
|---|---|---|---|
| D10 | 41.200 | 11.328 | 0.700 |
| D21 | 0.402 | 6.760 | 12.869 |

*Aspherical Coefficient
A = 0.0
B = 2.095 × 10$^{-6}$
C = −1.8006 × 10$^{-9}$
D = 1.7859 × 10$^{-11}$
E = −1.417 33 10$^{-14}$

Example 3
F = 28.6–78.6    FNo. = 1:4–4.5    2ω = 74.2°–30.8°

| | | | |
|---|---|---|---|
| R1 = 43.451 | D1 = 2.00 | N1 = 1.77250 | ν1 = 49.6 |
| R2 = 23.418 | D2 = 9.99 | | |
| R3 = 97.864* | D3 = 3.00 | N2 = 1.49171 | ν2 = 57.4 |
| R4 = 97.928 | D4 = 0.94 | | |
| R5 = 151.890 | D5 = 5.48 | N3 = 1.70154 | ν3 = 41.2 |
| R6 = −70.150 | D6 = 1.90 | | |
| R7 = 55.630 | D7 = 1.50 | N4 = 1.88300 | ν4 = 40.8 |
| R8 = 45.974 | D8 = 1.93 | | |
| R9 = 40.995 | D9 = 3.41 | N5 = 1.84666 | ν5 = 23.9 |
| R10 = 128.056 | D10 = Variable | | |
| R11 = 66.503 | D11 = 2.29 | N6 = 1.80400 | ν6 = 46.6 |
| R12 = −369.346 | D12 = 0.15 | | |
| R13 = 24.711 | D13 = 3.05 | N7 = 1.69680 | ν7 = 55.5 |
| R14 = 70.140 | D14 = 0.15 | | |
| R15 = 28.824 | D15 = 2.23 | N8 = 1.77250 | ν8 = 49.6 |
| R16 = 54.627 | D16 = 2.00 | | |
| R17 = 0.0 | D17 = 0.30 | | |
| R18 = 288.438 | D18 = 5.02 | N9 = 1.84666 | ν9 = 23.9 |
| R19 = 16.957 | D19 = 6.27 | | |
| R20 = 82.983 | D20 = 2.00 | N10 = 1.58144 | ν10 = 40.7 |
| R21 = −43.021 | D21 = 0.15 | | |
| R22 = 47.792 | D22 = 1.34 | N11 = 1.49831 | ν11 = 65.0 |
| R23 = 137.602 | D23 = Variable | | |
| R24 = 1673.303 | D24 = 0.94 | N12 = 1.77250 | ν12 = 49.6 |
| R25 = 36.880 | D25 = 0.67 | | |
| R26 = 45.218 | D26 = 1.96 | N13 = 1.59270 | ν13 = 35.3 |
| R27 = 245.173 | | | |

| f | 28.686 | 55.472 | 78.598 |
|---|---|---|---|
| D10 | 41.718 | 10.184 | 0.124 |
| D23 | 0.390 | 4.605 | 8.050 |

*Aspherical Coefficient
A = 0.0
B = 3.1509 × $10^{-6}$
C = 5.4967 × $10^{-9}$
D = −1.519 × $10^{-11}$
E = 3.8578 × $10^{-14}$

Example 4
F = 29.1–82.1    FNo. 1:4–4.5    2ω = 73.3°–29.5°

| | | | |
|---|---|---|---|
| R1 = 51.307 | D1 = 1.90 | N1 = 1.80400 | ν1 = 46.6 |
| R2 = 23.226 | D2 = 6.00 | | |
| R3 = 64.190* | D3 = 3.00 | N2 = 1.49171 | ν2 = 57.4 |
| R4 = 70.028 | D4 = 2.01 | | |
| R5 = 484.490 | D5 = 1.60 | N3 = 1.88300 | ν3 = 40.8 |
| R6 = 36.175 | D6 = 2.57 | | |
| R7 = 76.671 | D7 = 2.06 | N4 = 1.78472 | ν4 = 25.7 |
| R8 = 145.509 | D8 = 0.12 | | |
| R9 = 35.639 | D9 = 3.72 | N5 = 1.80518 | ν5 = 25.4 |
| R10 = 86.222 | D10 = Variable | | |
| R11 = 34.524 | D11 = 4.26 | N6 = 1.80400 | ν6 = 46.6 |
| R12 = 258.192 | D12 = 1.50 | | |
| R13 = 0.0 | D13 = 0.50 | | |
| R14 = 28.971 | D14 = 2.56 | N7 = 1.69680 | ν7 = 55.5 |
| R15 = 43.847 | D15 = 0.13 | | |
| R16 = 21.927 | D16 = 2.97 | N8 = 1.61765 | ν8 = 55.0 |
| R17 = 47.977 | D17 = 1.26 | | |
| R18 = 271.483 | D18 = 3.10 | N9 = 1.84666 | ν9 = 23.9 |
| R19 = 16.911 | D19 = 2.15 | | |
| R20 = 56.218 | D20 = 3.83 | N10 = 1.78590 | ν10 = 44.2 |
| R21 = −58.375 | D21 = Variable | | |
| R22 = −336.346 | D22 = 3.79 | N11 = 1.59270 | ν11 = 35.3 |
| R23 = −41.945 | D23 = 3.69 | N12 = 1.83481 | ν12 = 42.7 |
| R24 = 39.767 | D24 = 1.11 | | |
| R25 = 51.795 | D25 = 4.36 | N13 = 1.59270 | ν13 = 35.3 |
| R26 = −70.554 | | | |

| f | 29.093 | 55.376 | 82.060 |
|---|---|---|---|
| D10 | 47.186 | 13.109 | 0.749 |

-continued
Example 4
F = 29.1–82.1    FNo. 1:4–4.5    2ω = 73.3°–29.5°

| D21 | 0.597 | 6.717 | 12.597 |
|---|---|---|---|

*Aspherical Coefficient
A = 0.0
B = 3.509 × $10^{-6}$
C = 4.730 × $10^{-10}$
D = 9.252 × $10^{-12}$
E = 1.432 × $10^{-14}$

Example 5
F = 28.7–81.3    FNo. 1:4–4.5    2ω = 74.0°–29.8°

| | | | |
|---|---|---|---|
| R1 = 49.845 | D1 = 2.20 | N1 = 1.83400 | ν1 = 37.2 |
| R2 = 22.683 | D2 = 6.39 | | |
| R3 = 82.827* | D3 = 3.00 | N2 = 1.49171 | ν2 = 57.4 |
| R4 = 82.827 | D4 = 1.81 | | |
| R5 = −587.732 | D5 = 1.50 | N3 = 1.83400 | ν3 = 37.2 |
| R6 = 40.256 | D6 = 2.63 | | |
| R7 = 37.865 | D7 = 3.50 | N4 = 1.84666 | ν4 = 23.9 |
| R8 = 246.554 | D8 = Variable | | |
| R9 = 40.026 | D9 = 3.05 | N5 = 1.77250 | ν5 = 49.6 |
| R10 = 135.262 | D10 = 0.15 | | |
| R11 = 26.750 | D11 = 3.42 | N6 = 1.71300 | ν6 = 53.8 |
| R12 = 80.526 | D12 = 2.00 | | |
| R13 = 0.0 | D13 = 0.50 | | |
| R14 = 26.924 | D14 = 3.06 | N7 = 1.71300 | ν7 = 53.8 |
| R15 = 70.067 | D15 = 2.27 | | |
| R16 = −181.905 | D16 = 1.55 | N8 = 1.84666 | ν8 = 23.9 |
| R17 = 17.030 | D17 = 2.49 | | |
| R18 = 62.353 | D18 = 2.83 | N9 = 1.63636 | ν9 = 35.4 |
| R19 = −35.393 | D19 = Variable | | |
| R20 = −36.772 | D20 = 2.18 | N10 = 1.59551 | ν10 = 39.2 |
| R21 = −33.951 | D21 = 0.81 | | |
| R22 = −97.544 | D22 = 2.00 | N11 = 1.80610 | ν11 = 40.9 |
| R23 = 42.127 | D23 = 0.67 | | |
| R24 = 43.779 | D24 = 3.00 | N12 = 1.62004 | ν12 = 36.3 |
| R25 = −97.032 | | | |

| f | 28.700 | 54.515 | 81.264 |
|---|---|---|---|
| D8 | 43.407 | 11.673 | 0.015 |
| D19 | 0.612 | 6.011 | 11.411 |

Aspherical Coefficient
A = 0.0
B = 1.0305 × $10^{-6}$
C = 4.379 × $10^{-9}$
D = −2.885 × $10^{-12}$
E = 2.8756 × $10^{-15}$ The term "unit" is also referred to as "group" or "component" throughout the specification. These terms are intended to convey the same meaning.

What I claim:

1. A wide angle zoom objective having the following conditions:
   first, second and third lens units arranged from front to rear;
   the first lens unit having a negative refractive power and at least one lens with an aspherical surface;
   the second lens unit having a positive refractive power;
   the third lens unit having a negative refractive power, and said lens being arranged so that zooming is performed by differentially moving said first lens unit, said second lens unit, and said third lens unit;
   wherein when the focal length of the lens having an aspheric surface is denoted as $f_{MO}$, and the focal length at the wide angle end of the total lens system is expressed as fw, the following inequality is satisfied: $|f_{MO}| < 10fw$.

2. A wide angle zoom objective according to claim 1, wherein said first lens unit includes:

a meniscus-shaped first lens of negative refractive power convex toward the front and in the frontmost position, a mensicus-shaped second lens of positive refractive power convex toward the front and in the rearmost position, and a third lens having an aspherical surface and composed of plastic material and located between said first lens and said second lens.

3. A wide angle zoom objective having the following conditions:

first, second and third lens units arranged from front to rear, the first lens unit having a negative refractive power and at least one lens with an aspherical surface;

the second lens unit having a positive refractive power;

the third lens unit having a negative refractive power, and said lens being arranged so that zooming is performed by moving said first lens unit, said second lens unit, and said third lens unit;

said first lens unit including:

a meniscus-shaped first lens of negative refractive power convex toward the front and in the frontmost position;

a meniscus-shaped second lens of positive refractive power convex toward the front and in the rearmost position;

a third lens having an aspherical surface and composed of plastic material and located between said firsrt lens and said second lens;

the front surface of said third lens being an aspherical surface, and said aspherical surface being calculated taking an x-axis along the optical axis, a y-axis in a direction perpendicular to the x-axis, and the direction in which light advances as positive, with the origin at the intersection of the vertex of the lens surface and the x-axis, and letting R denote the radius of curvature of the paraxial region, H the height measured from the optical axis, A, B, C, D and E the aspherical coefficients, and, upon reference to an equation for the difference $\Delta X$ between the aspherical surface, and a spherical surface as extensively conformed to the paraxial region for contributing to determine the focal length in the directions of x-axis, expressed as:

$$\Delta X = \frac{\left(\frac{1}{R}\right) H^2}{1 + \sqrt{1 - \left(\frac{H}{R}\right)^2}} + AH^2 + BH^4 + CH^6 + DH^8 + EH^{10},$$

the following conditions being satisfied:

$1.0 \times 10^{-6} < B < 5.0 \times 10^{-6}$ (i)

$-2.0 \times 10^{-9} < C < 6.0 \times 10^{-9}$ (ii).

4. A wide angle zoom objective according to claim 1, wherein the air separation between the second lens unit and the third lens unit increases during zooming from the wide angle end to the telephoto end.

5. A zoom lens, comprising a first lens unit of a negative power having a positive lens with one aspheric surface, a second lens unit of a positive power positioned in the rear of said first lens unit, and a third lens unit of a negative power positioned in the rear of said second lens unit, the first, second and third lens units being arranged for moving differentially for zooming, and the axial air separation between the second lens unit and the third lens unit increasing when zooming from the wide angle and to the telephoto end.

6. A zoom lens according to claim 5, wherein the first lens unit includes a negative meniscus lens and the positive lens is of a meniscus shape having its convex surface face toward the object and is positioned in the rear of the negative meniscus lens.

7. A zoom lens according to claim 6, wherein the positive lens is made of a plastic material.

8. A zoom lens according to claim 5, wherein when the focal length of said positive lens is denoted as $f_{MO}$, and the focal length of the total lens system is expressed as fw, the following inequality is satisfied: $|f_{MO}|$ '10fw.

* * * * *